(12) United States Patent
Wiebe

(10) Patent No.: US 9,399,926 B2
(45) Date of Patent: Jul. 26, 2016

(54) BELLY BAND SEAL WITH CIRCUMFERENTIAL SPACER

(71) Applicant: David J. Wiebe, Orlando, FL (US)

(72) Inventor: David J. Wiebe, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 211 days.

(21) Appl. No.: 13/974,147

(22) Filed: Aug. 23, 2013

(65) Prior Publication Data

US 2015/0056068 A1 Feb. 26, 2015

(51) Int. Cl.
| F01D 11/08 | (2006.01) |
| F01D 5/06 | (2006.01) |
| F01D 11/00 | (2006.01) |
| F02C 7/28 | (2006.01) |

(52) U.S. Cl.
CPC ........... *F01D 11/08* (2013.01); *F01D 5/06* (2013.01); *F01D 5/066* (2013.01); *F01D 11/003* (2013.01); *F01D 11/005* (2013.01); *F01D 11/008* (2013.01); *F02C 7/28* (2013.01)

(58) Field of Classification Search
None
See application file for complete search history.

(56) References Cited

U.S. PATENT DOCUMENTS

| 5,149,109 | A * | 9/1992 | Jelinek et al. ............... 277/632 |
| 5,320,488 | A | 6/1994 | Meade et al. |
| 5,865,600 | A | 2/1999 | Mori et al. |
| 5,967,746 | A | 10/1999 | Hagi et al. |
| 6,089,827 | A | 7/2000 | Ichiryu et al. |
| 6,261,063 | B1 | 7/2001 | Chikami et al. |
| 6,315,301 | B1 | 11/2001 | Umemura et al. |
| 7,165,772 | B1 * | 1/2007 | Camacho ............... B64D 13/02 277/496 |
| 7,470,113 | B2 | 12/2008 | Tran et al. |
| 7,549,845 | B2 | 6/2009 | Uwami et al. |
| 7,581,931 | B2 | 9/2009 | Shaefer et al. |
| 2009/0148279 | A1 | 6/2009 | Shaefer et al. |
| 2009/0191050 | A1 | 7/2009 | Nereim et al. |
| 2010/0074731 | A1 | 3/2010 | Wiebe et al. |

FOREIGN PATENT DOCUMENTS

| DE | 102006004613 A1 | 8/2006 |
| EP | 0979961 A1 | 2/2000 |
| EP | 1431018 A2 | 6/2004 |

* cited by examiner

*Primary Examiner* — Ninh H Nguyen
*Assistant Examiner* — Justin Seabe

(57) ABSTRACT

A circumferentially extending sealing band is located within sealing band receiving slots formed in adjacent turbine engine disks. The sealing band includes a plurality of seal strips forming overlap joints defined by overlapping end portions, each formed by a tongue portion extending from a seal face of one seal strip past a seal face of the adjacent seal strip, along a radially inward facing side of the adjacent seal strip. A joint gap is defined within at least one overlap joint between the seal face of the one seal strip and the seal face of the adjacent strip, and a spacer is affixed to the one seal strip and is located at a position within the joint gap between the seal faces to limit circumferential movement of the seal faces toward each other.

17 Claims, 8 Drawing Sheets

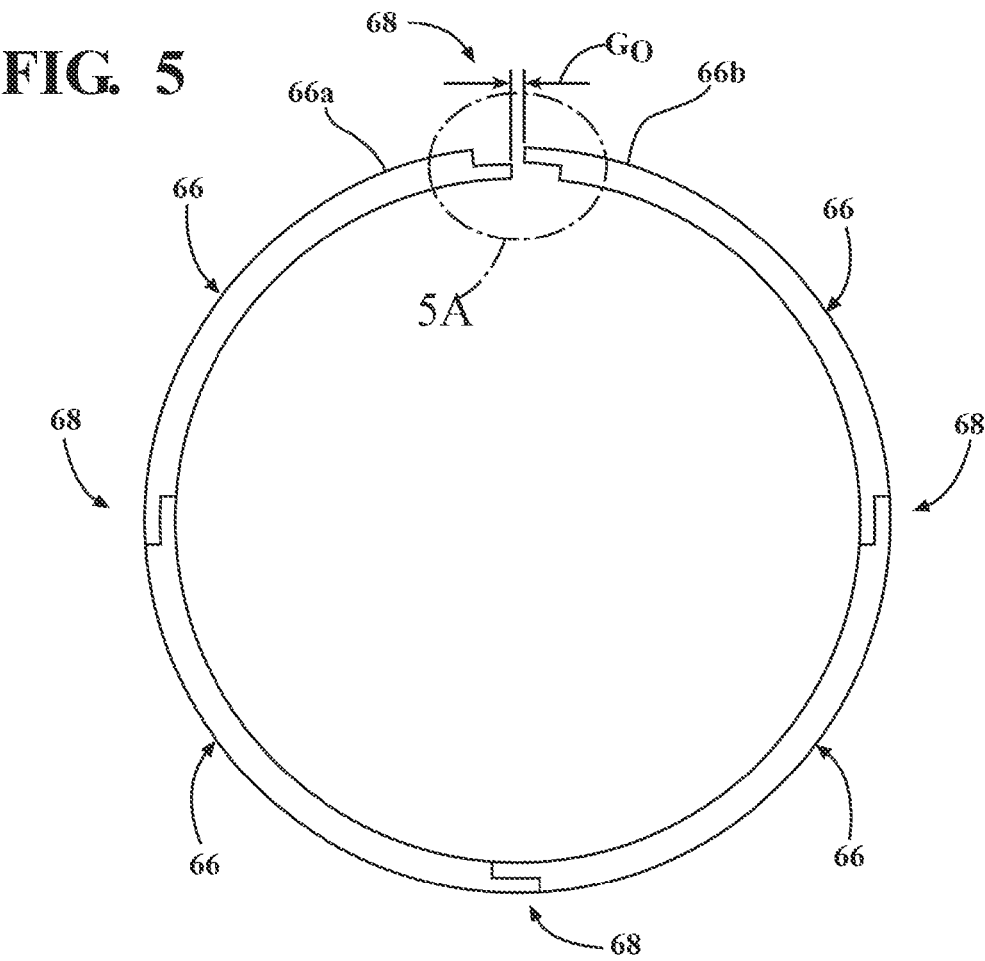
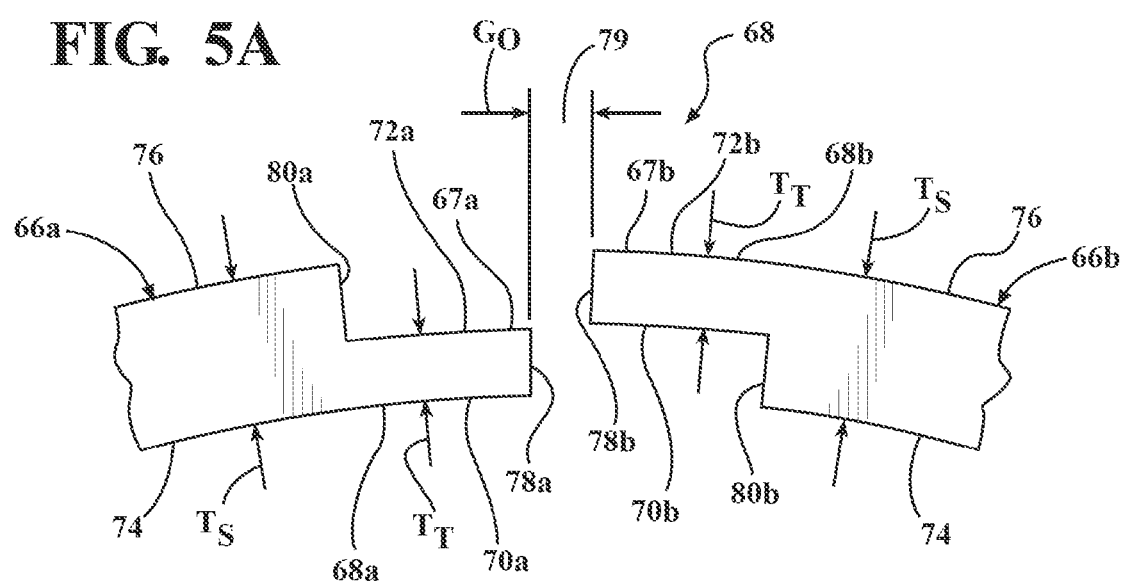

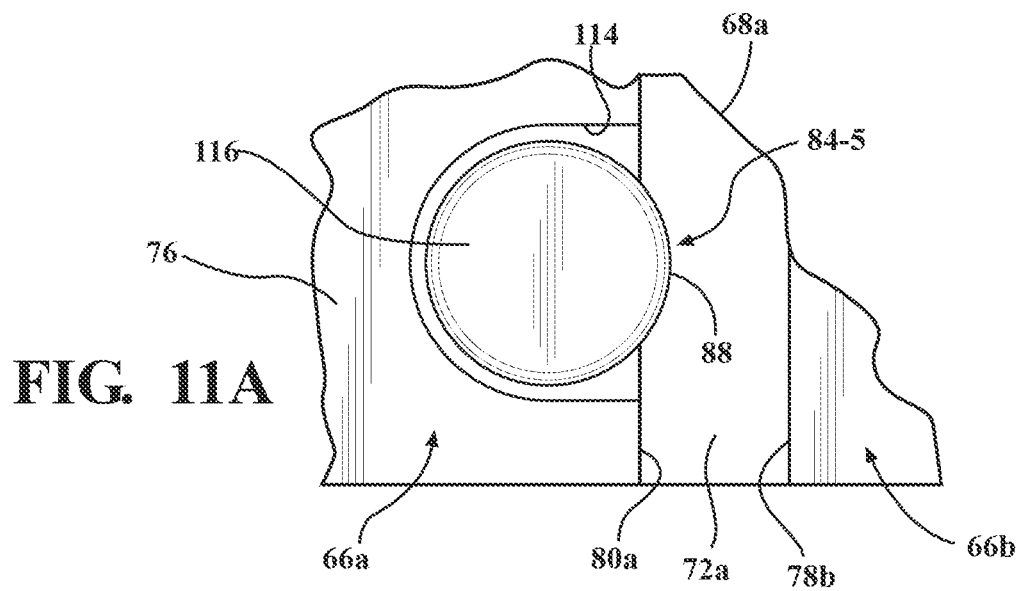
FIG. 11A
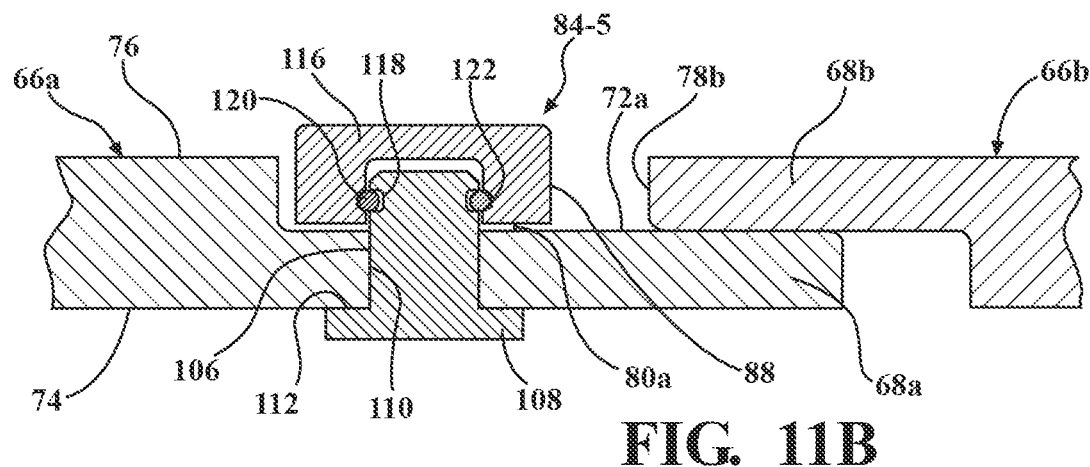
FIG. 11B
FIG. 12
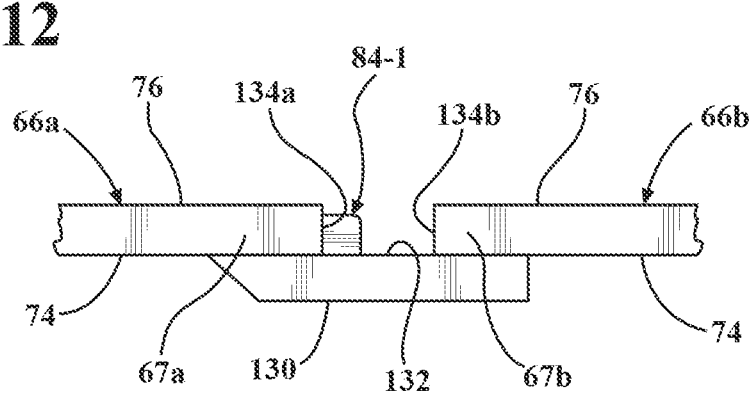

BELLY BAND SEAL WITH CIRCUMFERENTIAL SPACER

FIELD OF THE INVENTION

This invention relates in general to seals for multistage turbomachines and, more particularly, to an optimized baffle seal provided between adjoining disks in a multistage turbomachine.

BACKGROUND OF THE INVENTION

In various multistage turbomachines used for energy conversion, such as turbines, a fluid is used to produce rotational motion. In a gas turbine, for example, a gas is compressed through successive stages in a compressor and mixed with fuel in a combustor. The combination of gas and fuel is then ignited for generating combustion gases that are directed to turbine stages to produce the rotational motion. The turbine stages and compressor stages typically have stationary or non-rotary components, e.g., vane structures, that cooperate with rotatable components, e.g., rotor blades, for compressing and expanding the operational gases.

The rotor blades are typically mounted to disks that are supported for rotation on a rotor shaft. Annular arms extend from opposed portions of adjoining disks to define paired annular arms. A cooling air cavity is formed on an inner side of the paired annular arms between the disks of mutually adjacent stages, and a labyrinth seal may be provided on the inner circumferential surface of the stationary vane structures for cooperating with the annular arms to effect a gas seal between a path for the hot combustion gases and the cooling air cavity. The paired annular arms extending from opposed portions of adjoining disks define opposing end faces located in spaced relation to each other. Typically the opposing end faces may be provided with a slot for receiving a sealing band, also known as a "baffle seal," "belly band seal" or "belly band", which bridges the gap between the end faces to prevent cooling air flowing through the cooling air cavity from leaking into the path for the hot combustion gases. The sealing band may be formed of plural segments, in the circumferential direction, that are typically interconnected at a sealing joint such as at a shiplap joint between the ends to prevent passage of gases past the joint.

SUMMARY OF THE INVENTION

In accordance with an aspect of the invention, a sealing band is provided for use in a turbomachine having a plurality of stages, each stage comprising a rotatable disk and blades carried thereby, and at least one pair of adjacent rotatable disks defining an annular gap therebetween and having respective opposing sealing band receiving slots aligned with the annular gap. A circumferentially extending sealing band is located within the slots and comprises a plurality of seal strips located in series adjacent to one another, and adjacent seal strips including ends located adjacent to one another. Overlap joints are defined by overlapping end portions between adjacent seal strips, the overlapping end portions each being formed by a tongue portion extending from a seal face of one seal strip past a seal face of the adjacent seal strip, along a radially inward facing side of the adjacent seal strip. A joint gap is defined within at least one overlap joint between the seal face of the one seal strip and the seal face of the adjacent strip, and the seal faces face one another at opposing circumferential sides of the gap. A spacer is affixed to the one seal strip and is located at a position within the joint gap between the seal faces to limit circumferential movement of the seal faces toward each other.

The spacer may be positioned on a radially outward facing side of the tongue portion.

Each overlapping end portion may include a first tongue portion forming an inner half of a shiplap joint and a second tongue portion forming an outer half of a shiplap joint, an end of the second tongue portion may define the seal face of the adjacent seal strip, and the first tongue portion may define the tongue portion extending from a seal face of one seal strip past a seal face of the adjacent seal strip.

The tongue portion may define a radial thickness dimension that is less than a radial thickness between radial inner and outer surfaces of the segments.

The spacer may be defined by a weld bead formed on the tongue portion and defining an engagement surface spaced circumferentially from the seal face of the one seal strip for engaging the seal face of the adjacent seal strip.

The spacer may be defined by a metal piece that is brazed or welded to the tongue and includes at least a portion spaced circumferentially from the seal face of the one seal strip for engaging the seal face of the adjacent seal strip.

The spacer may be defined by a tang that is integral with and extends from a radially outer surface of the one seal strip.

The one seal strip may include a hole, and the spacer may include a shaft extending through the hole and a head portion connected to the shaft and positioned on a radially outward facing side of the one seal strip, and the spacer may be retained on the one seal strip via the shaft. A recess may be formed in the seal face of the one seal strip for receiving at least a portion of the head portion. The shaft may be a threaded shaft received in a threaded hole and the spacer may comprise notches formed in the head portion and engaged by material of the seal strip peened into the notches to prevent rotation of the shaft.

The spacer may include a flange extending from the shaft on a radially inward side of the one seal strip, and a cap may be engaged on an end of the shaft opposite from the flange.

The spacer may be dimensioned in an axial direction, perpendicular to the circumferential direction, to be smaller than the annular gap and located in spaced relation to the disks on either side of the annular gap.

In accordance with another aspect of the invention, a sealing band is provided for use in a turbomachine having a plurality of stages, each stage comprising a rotatable disk and blades carried thereby, and at least one pair of adjacent rotatable disks defining an annular gap therebetween and having respective opposing sealing band receiving slots aligned with the annular gap. A circumferentially extending sealing band is located within the slots and comprises a plurality of seal strips located in series adjacent to one another, and adjacent seal strips including ends located adjacent to one another. The seal strip ends overlap each other at overlap joints and adjacent seal strips include opposing seal faces movable into engagement with each other. The overlap joints are dimensioned such that an open gap is formed between two adjacent seal strip ends of one overlap joint when the opposing seal faces of all of the remaining overlap joints are positioned in engagement with each other. Each of the overlap joints are formed by a tongue portion extending from a seal face of one seal strip and adapted to extend past a seal face of an adjacent seal strip, along a radially inward facing side of the adjacent seal strip. A joint gap is defined within at least one overlap joint between the seal face of the one seal strip and the seal face of the adjacent strip, and the seal faces face one another in opposing relation to each other. A spacer is affixed to one of the two adjacent seal strip ends at a position adjacent to one of the seal faces, and is positioned at a radially outward facing side of the tongue portion to limit circumferential movement of the seal faces toward each other.

At least two spacers may be provided to respective joint gaps wherein the spacers may be affixed to respective ones of the seal strip ends after the seal strips are assembled in the sealing band receiving slots.

Each of the spacers may extend circumferentially from respective ones of the seal faces a respective spacer distance, and the combined spacer distances of all of the spacers may be at least equal to a dimension of the open gap in the circumferential direction.

A spacer may be affixed to the tongue portion of each seal strip.

Plural spacers may be provided and one of the spacers may be affixed to each of the seal strip ends of the sealing band after the seal strips are assembled in the sealing band receiving slots. Each of the spacers may extend circumferentially from respective ones of the seal faces a respective spacer distance, and the combined spacer distances of all of the spacers may be at least equal to a dimension of the open gap in the circumferential direction.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 5 is an axial elevation view of the seal band illustrating an open gap formed when the seal strips are compacted together at the overlap joints;

FIG. 5A is an enlarged view of the open gap illustrated in area 5A of FIG. 5;

FIG. 11A is a top plan view of an overlap joint formed by two seal strips including a fourth alternative spacer located at the tongue portion of one of the seal strips;

FIG. 11B is an elevation view of the overlap joint shown in FIG. 11A; and

FIG. 12 is an elevation view of the invention implemented on an alternative seal strip structure.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
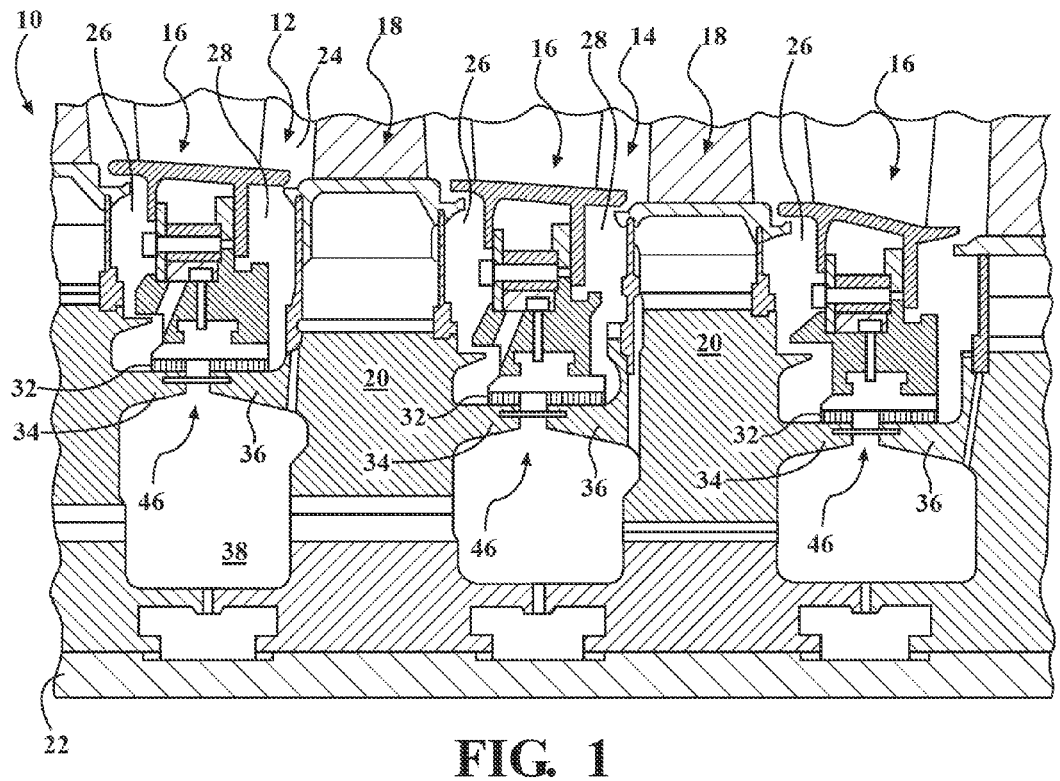
FIG. 1 is a diagrammatic section view of a portion of a gas turbine engine including a seal strip assembly in accordance with the present invention.

Referring to FIG. 1, a portion of a turbine engine 10 is illustrated diagrammatically including adjoining stages 12, 14, each stage 12, 14 comprising an array of stationary vane assemblies 16 and an array of rotating blades 18, where the vane assemblies 16 and blades 18 are positioned circumferentially within the engine 10 with alternating arrays of vane assemblies 16 and blades 18 located in the axial direction of the turbine engine 10. The blades 18 are supported on rotor disks 20 secured to adjacent disks with spindle bolts 22. The vane assemblies 16 and blades 18 extend into an annular gas passage 24, and hot gases directed through the gas passage 24 flow past the vane assemblies 16 and blades 18 to remaining turbine elements.

Disk cavities 26, 28 are located radially inwardly from the gas passage 24. Purge air is preferably provided from cooling gas passing through internal passages in the vane assemblies 16 to the disk cavities 26, 28 to cool the blades 18 and to provide a pressure to balance against the pressure of the hot gases in the gas passage 24. In addition, interstage seals comprising labyrinth seals 32 are supported at the radially inner side of the vane assemblies 16 and are engaged with surfaces defined on paired annular disk arms 34, 36 extending axially from opposed portions of adjoining disks 20. An annular cooling air cavity 38 is formed between the opposed portions of adjoining disks 20 on a radially inner side of the paired annular disk arms 34, 36. The annular cooling air cavity 38 receives cooling air passing through disk passages to cool the disks 20.

Figure 2:
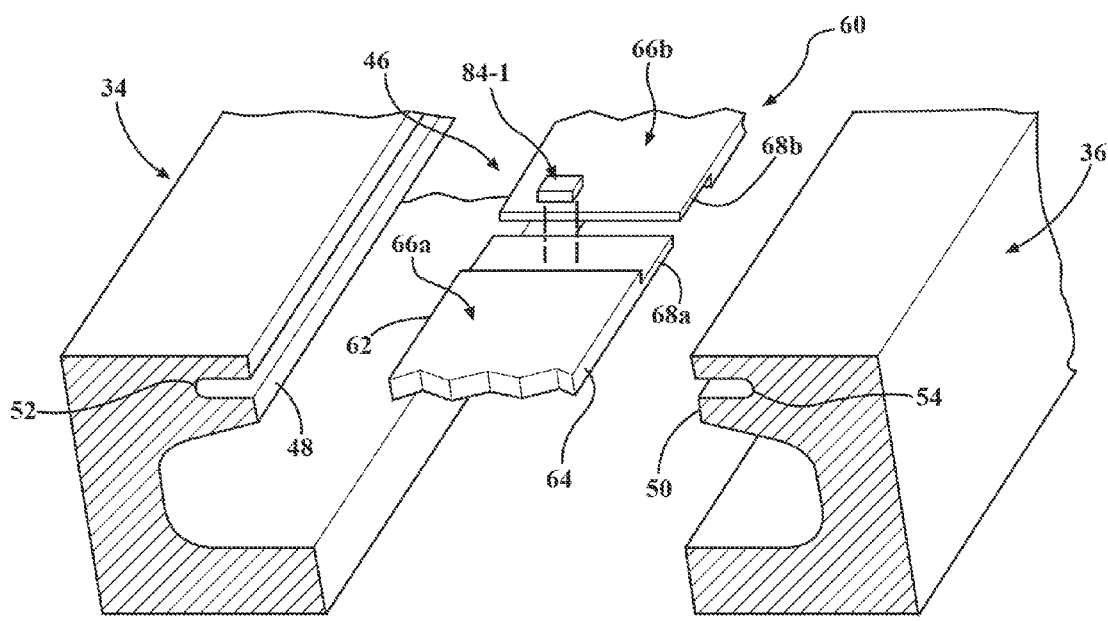
FIG. 2 is an exploded perspective view illustrating aspects of the present invention.

Referring further to FIG. 2, the disk arms of two adjoining disks 20 are illustrated for the purpose of describing the seal strip assembly 46 of the present invention, it being understood that the disks 20 and associated disk arms 34, 36 define an annular structure extending the full circumference about the rotor centerline. The disk arms 34, 36 define respective opposed disk end faces 48, 50 located in closely spaced relation to each other. A circumferentially extending sealing band receiving slot 52, 54 is formed in the respective disk end faces 48, 50, wherein the slots 52, 54 are radially aligned with an annular gap 56 (FIG. 3) defined between the disk end faces 48, 50.

Figure 3:
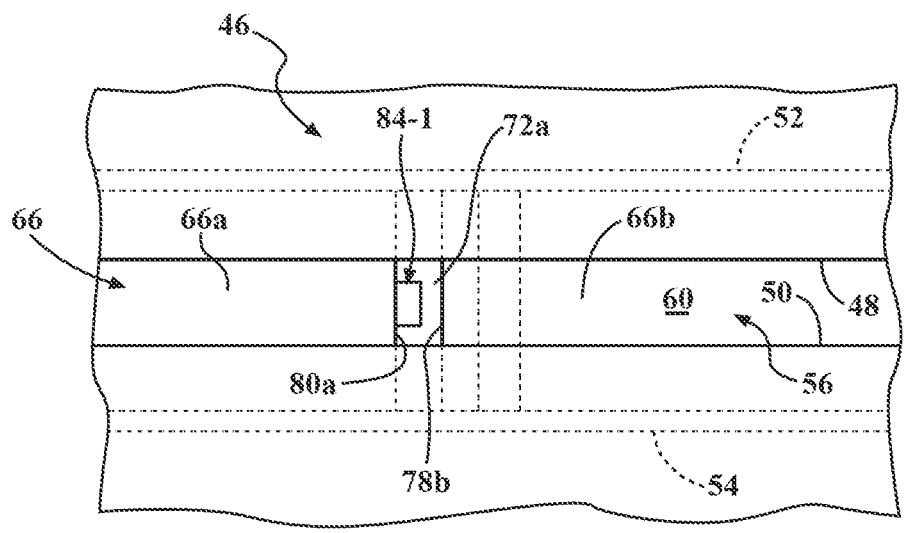
FIG. 3 is a plan view of a pair of seal strips assembled extending between adjacent disk arms with a spacer located in a shiplap joint gap formed at an overlap joint between the seal strips.

As seen in FIG. 3, the seal strip assembly 46 includes a sealing band 60 forming a circumferentially extending belly band seal. The sealing band 60 includes opposing sealing band edges 62, 64 which are positioned within the respective slots 52, 54 defined in the opposed end faces 48, 50. The sealing band 60 spans the annular gap 56 between the end faces 48, 50 and defines a seal for preventing or substantially limiting flow of gases between the cooling air cavity 38 and the disk cavities 26, 28. Further, the sealing band 60 is comprised of a plurality of segments, typically four segments, referred to herein as seal strips 66. However, it should be understood that, within the scope of the present invention, a greater or fewer number of seal strips 66 may be provided.

Figure 4:
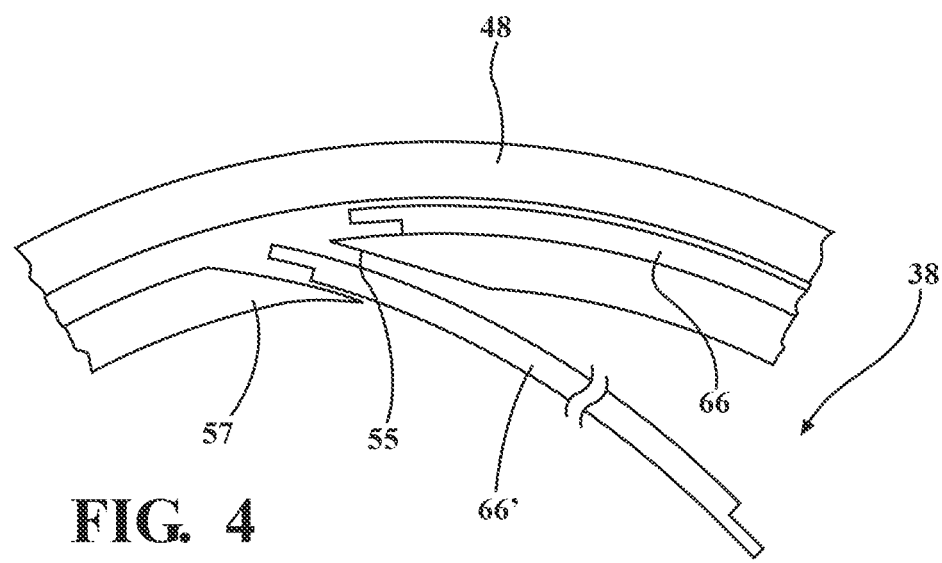
FIG. 4 is an axial elevation view showing assembly of seal strips into a seal band receiving slot.

In a typical installation of the seal strips 66, the plurality of seal strips 66 are initially located in the cooling air cavity 38 (FIG. 1). The seal strips 66 are then individually positioned in the sealing band receiving slots 52, 54 by pulling an end of each seal strip 66 radially outward and passing the seal strip 66 through a radially and circumferentially extending groove or slot 55 formed in a lower portion 57 of each disk end face 48, 50, illustrated herein on end face 48 in FIG. 4. It may be understood that each seal strip 66 is formed as an elongated member extending circumferentially within the engine 10 and includes opposing ends located adjacent to ends of adjacent seal strips 66. It should be understood that the term "circumferentially", as it is used with reference to the seal strips 66, refers to a direction that is parallel to a line extending between opposing ends of a seal strip 66. As shown in FIG. 4, a seal strip 66 is located within the slots 52, 54 and a further seal strip 66' is shown in the process of being positioned into the slots 52, 54.

Figure 6:
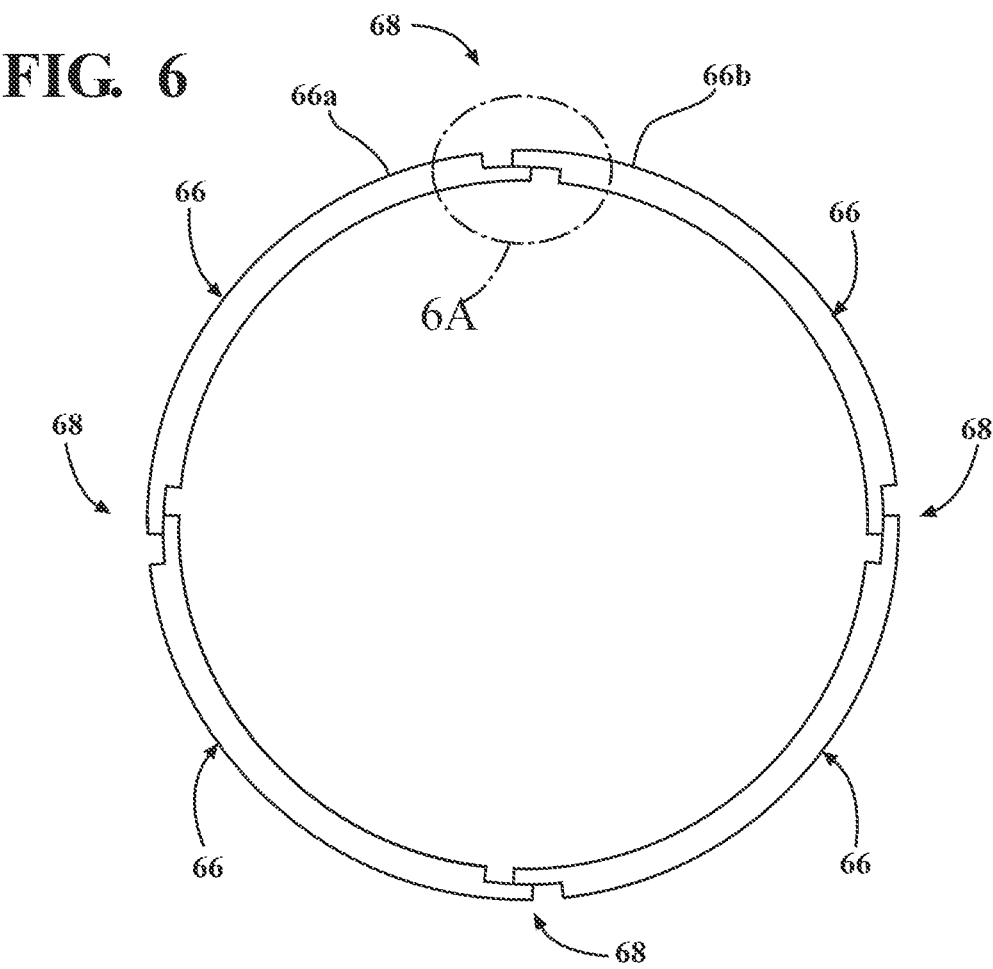
FIG. 6 is an axial elevation view of the seal band illustrating equally distributed joint gaps formed at overlap joints between the seal strips of the seal bands.
Figure 6A:
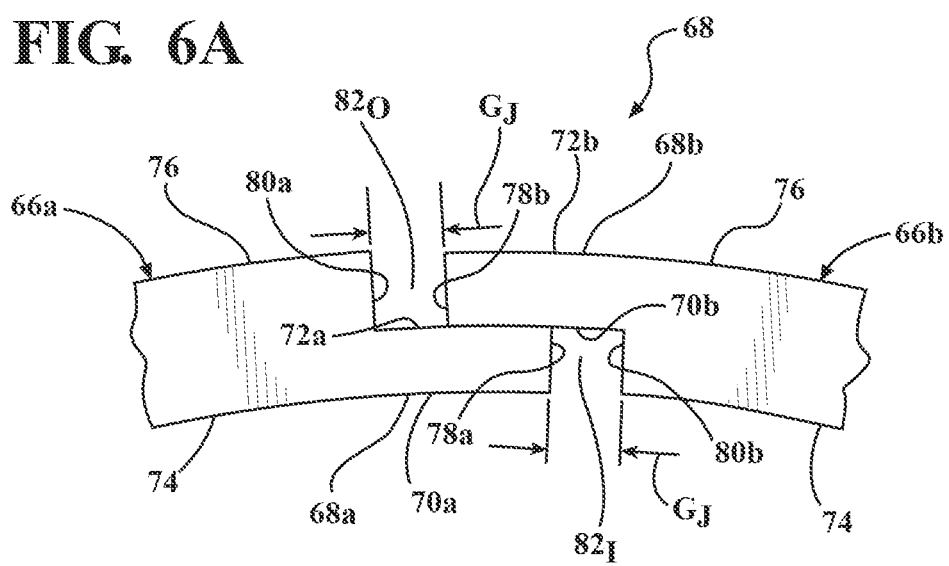
FIG. 6A is an enlarged view of an overlap joint in area 6A of FIG. 6.

As may be best seen in FIGS. 5A and 6A, the ends of the seal strips 46 are configured to form overlap joints 68 and, for the purposes of the present description, are depicted as shiplap joints, although it may be understood that other configurations for the overlap joints 68 could be implemented in the present invention, and the term "overlap joint" is intended to encompass any alternative configuration of overlapping seal strip elements. Only one overlap joint 68 will be described in detail. However, it may be understood that the described joint 68 is typical of all adjoining ends of the seal strips 66 in the sealing band 60.

FIGS. 5A and 6A illustrate adjacent ends 67a, 67b of respective first and second seal strips 66a, 66b. The seal strips 66a, 66b are located to form the overlap joint 68 and the first seal strip 66a is formed with a circumferentially extending first tongue portion 68a forming an inner half of the shiplap joint, and the second seal strip 66b is formed with a second tongue portion 68b forming an outer half of the shiplap joint.

Referring in particular to FIG. 5A, the first tongue portion 68a defines a radial thickness $T_T$ between radial inner and outer sides 70a, 72a of the tongue portion 68a that is less than a radial thickness $T_S$ between radial inner and outer surfaces 74, 76 of the seal strip 66a, wherein it may be understood that the radial inner side 70a of the tongue portion 68a is contiguous with the inner surface 74 of the seal strip 66a. For example, the thickness $T_T$ of the first tongue portion 68a may be about half the thickness $T_S$ of the seal strip 66a, and the thickness of the seal strip 66a is generally uniform along the circumferential extent thereof, except for the ends. The first tongue portion 68a further includes an outer seal face 78a located at the end 67a (FIG. 5) of the seal strip 66a and an inner seal face 80a located circumferentially spaced from the end 67a.

The second tongue portion 68b defines a radial thickness $T_T$ between radial inner and outer sides 70b, 72b of the tongue portion 68b that is less than the radial thickness $T_S$ between the radial inner and outer surfaces 74, 76 of the seal strip 66b, wherein it may be understood that the radial outer side 72b of the tongue portion 68b is contiguous with the outer surface 76 of the seal strip 66b. For example, the thickness $T_T$ of the second tongue portion 68b may be about half the thickness $T_S$ of the seal strip 66b, and the thickness of the seal strip 66b is generally the same as the thickness of all of the other seal strips, e.g., the same as the seal strip 66a, and is uniform along the circumferential extent thereof, except for the ends. The second tongue portion 68b further includes an outer seal face 78b located at the end 67b (FIG. 5) of the seal strip 66b and an inner seal face 80b located circumferentially spaced from the end 67a.

It should be understood that the particular configuration for the shiplap joint described herein is provided for exemplary purposes, and that the invention may be implemented with other overlapping joint configurations, including other shiplap joint configurations, without departing from the spirit and scope of the invention. For example, the present invention may be implemented with a known shiplap joint formed by overlapping seal strip ends wherein the outer and inner halves of the shiplap joint each comprise seal strip end portions having the same thickness as the main body of the seal strip, there being provided a transition of additional thickness, i.e., twice the main body thickness, at a transition between the main body and the shiplap ends.

In order to permit passage of the last seal strip 66 fully into the slots 52, 54, all of the seal strips 66 in the slots 52, 54 must be compacted together, fully closing the gaps of the shiplap joints between the seal strips 66. FIG. 5 illustrates the position of the seal strips 66 subsequent to passage of the last seal strip 66 into the slots 52, 54. FIG. 5A illustrates an open gap 79, having a circumferential dimension $G_O$, that exists between the ends 67a, 67b, i.e., between the outer seal faces 78a, 78b, of the first and last installed seal strips 66, and represents an opening that could form at any of the overlap joints 68 as a result of movement of the seal strips 66 in the slots 52, 54 in the absence of a mechanism to maintain a position or spacing of the seal strips 66 relative to each other. Such a gap is undesirable in that it can permit a flow of cool air from the cooling air cavity 38 radially outward, which can decrease the available cooling air within the cavity 38 and can decrease the cooling efficiency of the engine as a result of an increased amount of cooling air passing through the disk cavities 26, 28, and can possibly pass into the hot gas path to mix with the hot working gases with a resulting decrease in engine efficiency.

As seen in FIGS. 6 and 6A, after all of the seal strips 66 are positioned within the slots 52, 54, the seal strips 66 may be repositioned such that inner and outer joint gaps $82_I$, $82_O$ are formed having generally equal inner and outer joint gap dimensions $G_J$ formed at all of the overlap joints 68. The inner joint gap $82_I$ is defined by a spacing between the inner seal face 80b of the second seal strip 66b and the opposing outer seal face 78a of the first seal strip 66a, and the outer joint gap $82_O$ is defined by a spacing between the inner seal face 80a of the first seal strip 66a and the opposing outer seal face 78b of the second seal strip 66b.

In previously known configurations for seal bands, each of the seal strips were typically provided with anti-rotation or circumferential locking devices rigidly connected to the seal strips and engaging with a feature in one or both disks. For example, a locking or anti-rotation element located on the seal strip, such as by welding or use of a fastener, could be provided for engaging a notch in an end face of a disk arm to prevent circumferential movement of the seal strip and thereby maintain a predetermined relative position between the seal strips, including preventing formation of open gaps between adjacent seal strips. An example of an anti-rotation device may be seen in U.S. Pat. No. 7,581,931, which patent is incorporated herein by reference. However, it has been observed that circumferential locking devices may become liberated from the seal strip as a result of failure or release of the attachment mechanism (weld, fastener, etc.), thereby permitting circumferential movement of the seal strip. Failure of a locking device can result from various causes such as, for example, stress created by centrifugal forces on the devices and/or exposure of the locking device to impact by objects that may become liberated from other components, e.g., loose objects from interstage seals, resulting in the locking device becoming dislodged. In accordance with an aspect of the invention, a mechanism is provided for maintaining a predetermined, or minimum, spacing for the joint gaps $82_I$, $82_O$ to ensure that an open gap $G_O$ is not formed in the sealing band 60. Further, the mechanism for maintaining the spacing of the joint gaps $82_I$, $82_O$ is configured such that it does not rely on engagement with the disk arms 34, 36, i.e., does not rely on a circumferential locking device, to operate.

Figure 7A:
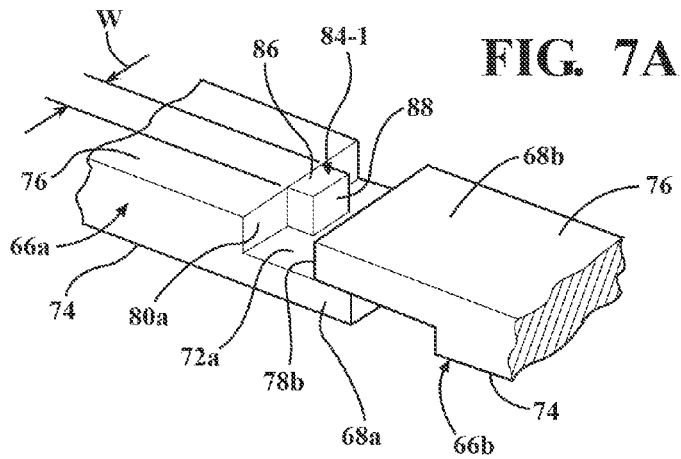
FIG. 7A is a perspective view of an overlap joint formed by two seal strips including a spacer located at the tongue portion of one of the seal strips.
Figure 7B:
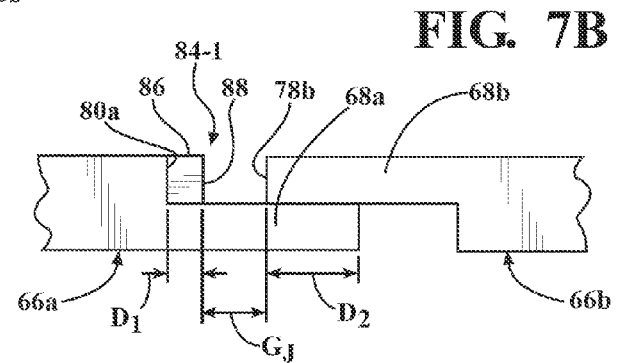
FIG. 7B is an elevation view of the overlap joint shown in FIG. 7A.

Referring to FIGS. 7A and 7B, a spacer 84-1 is illustrated for performing the function of maintaining a predetermined minimum spacing within the joint gap $82_O$ (FIG. 6A) between the opposing seal faces 80a, 78b, and is illustrated as a block shaped metallic member having a generally rectangular or square cross section, extending between the disk end faces 48, 50. The spacer 84-1 may be formed, for example, of a steel or nickel alloy and can be brazed or welded to the surface defined by the outer side 72a of the first tongue portion 68a. Alternatively or in addition, the spacer 84-1 may be brazed or welded to the inner seal face 80a. It may be noted that, in a preferred installation of the seal strips 66, a spacer 84-1 may be affixed at the first tongue portion 68a of each seal strip 66 subsequent to positioning of the seal strips 66 in the seal slots 52, 54, it being understood that the spacers 84-1 are provided to fill at least a portion of the circumferential space in the overlap joints 68 that is provided to facilitate installation of the seal strips 66.

As seen in FIG. 7A the spacer 84-1 is formed with a dimension, W, in the axial direction, perpendicular to the circumferential direction, that is smaller than the annular gap 56 formed between the disk arms 34, 36, such that the spacer 84-1 is in spaced relation to the disk arms 34, 36 on either side of the annular gap 56. The height or radial dimension of the spacer 84-1, i.e., the dimension from the outer side 72a of the first tongue portion 68a to an outer surface 86 of the spacer 84-1, may be approximately equal to or slightly less than the radial height between the tongue portion outer side 72a and the seal strip outer surface 76.

Further, the spacer 84-1 is sized such that a spacer distance defined by a circumferential dimension $D_1$ (FIG. 7B), measured from the inner seal face 80a to a circumferential spacer face 88 is less than the circumferential length of the tongue portion 68a and engages the outer seal face 78b of the second tongue portion 68b to maintain a predetermined minimum spacing between the inner seal face 80a and the outer seal face 78b. In a preferred embodiment, the circumferential dimension $D_1$ is less than a circumferential overlap dimension $D_2$ defining the overlap between the first and second tongue portions 68a, 68b. Typically, there may be a space between the circumferential face 88 of the spacer 84-1 and the outer seal face 78b. Also in a preferred embodiment, the combined circumferential dimension of all of the spacers 84-1, such as four spacers 84-1 provided to the first tongue portion 68a of four seal strips 66, is equal to or greater than the dimension $G_O$ of the open gap 79 (FIGS. 5 and 5A). In a most preferred embodiment, the combined circumferential dimension of the spacers 84-1 is greater than the dimension $G_O$ of the open gap 79, so as to prevent the possibility of cooling air flow passing outwardly from the cavity 38 through an unrestricted opening in the sealing band 60.

It may be understood that, although the spacers 84-1 may be implemented on the seal strips 66 without including circumferential locking or anti-rotation devices to prevent circumferential movement of the sealing band 60, the present spacers 84-1 may be used in combination with anti-rotation devices. In such a case, the spacers 84-1 could provide a back-up mechanism for ensuring that a predetermined relative position between adjacent seal strips 66 is maintained in the event of failure of one or more of the anti-rotation devices.

Figure 8A:
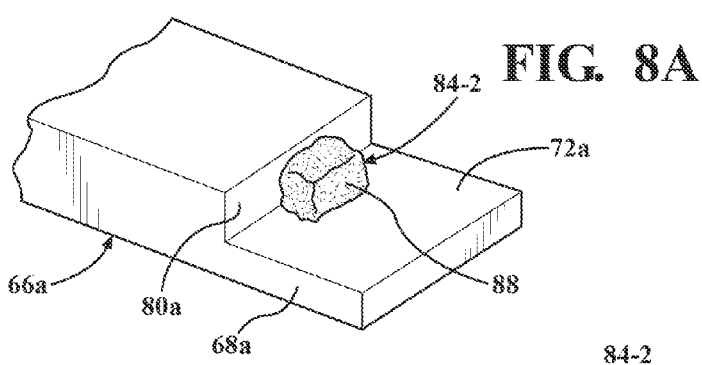
FIG. 8A is a perspective view of an overlap joint formed by two seal strips including a first alternative spacer located at the tongue portion of one of the seal strips.
Figure 8B:
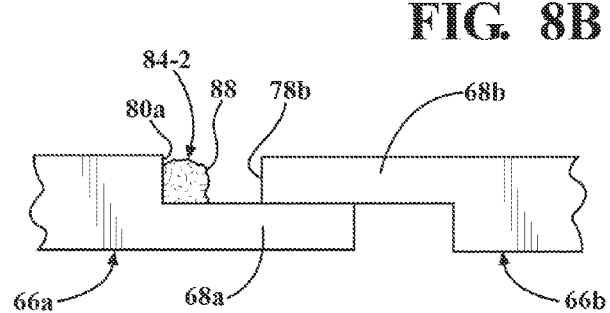
FIG. 8B is an elevation view of the overlap joint shown in FIG. 8A.

Referring to FIGS. 8A and 8B, a first alternative configuration comprising a spacer 84-2 is illustrated. The spacer 84-2 is formed by a weld build-up, such as may be produced by a plurality of passes of weld material to form the build-up to a predetermined dimension. In particular, the weld build-up of the spacer 84-2 is formed on the outer side 72a of the tongue portion 68a and may be about the same dimensions as described above for the spacer 84-1. The weld build-up of the spacer 84-2 defines a circumferential face 88 circumferentially spaced from the inner seal face 80a of the first tongue portion 68a, and adapted to engage the outer seal face 78b of the second tongue portion 68b. The spacer 84-2 may be configured to be implemented in the same manner as described above with reference to the spacer 84-1.

Figure 9A:
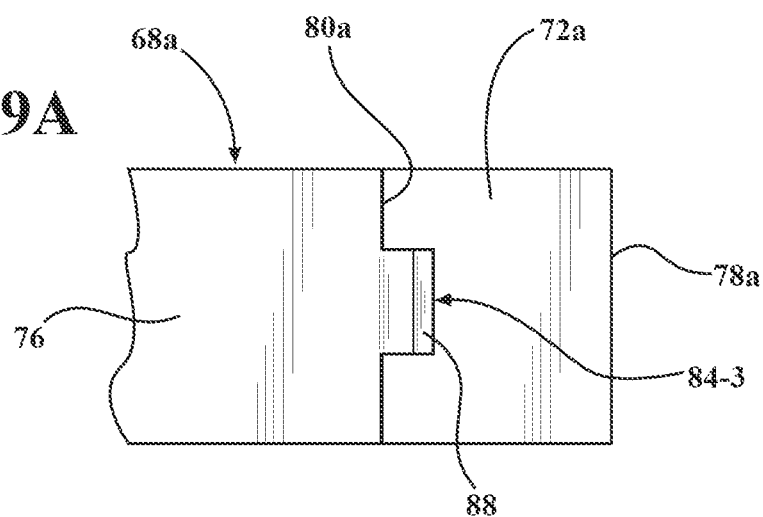
FIG. 9A is a top plan view of the end of a seal strip including a second alternative spacer affixed to one of the seal strips and located in a non-operative position.
Figure 9B:
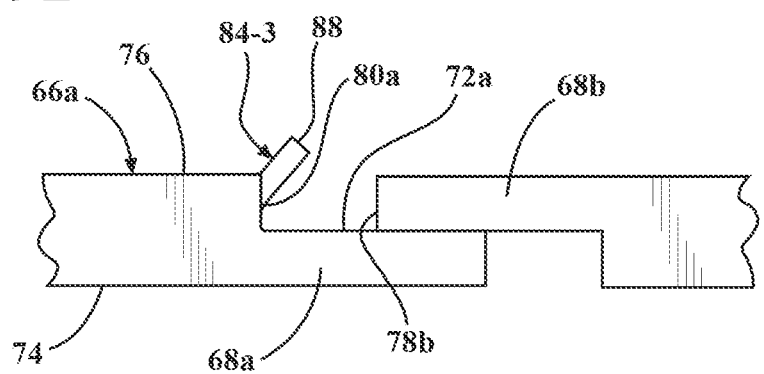
FIG. 9B is an elevation view of an overlap joint including the seal strip of FIG. 9A, and illustrating the spacer located in the non-operative position.
Figure 9C:
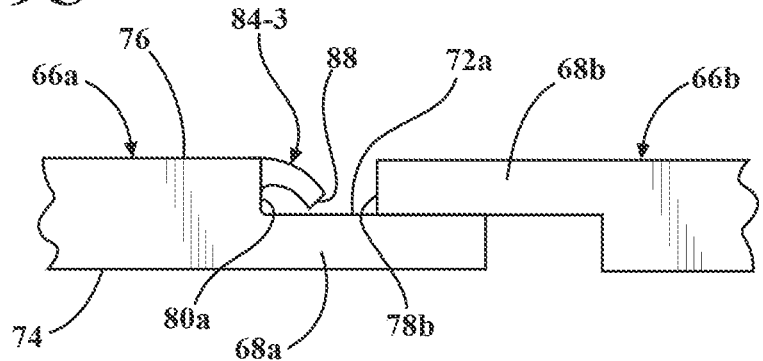
FIG. 9C is an elevation view of the overlap joint of FIG. 9B, and illustrating the spacer located in an operative position within the joint gap.

Referring to FIGS. 9A, 9B and 9C, a second alternative configuration comprising a spacer 84-3 is illustrated. The spacer 84-3 is defined by a tang that is integral with the first seal strip 66a adjacent to the outer surface 76 and extends circumferentially past the inner seal face 80a. As illustrated in FIGS. 9A and 9B, the spacer 84-3 is initially located radially outwardly from the joint gap defined between the inner seal face 80a of the first seal strip 66a and the outer seal face 78b defined by the second seal strip 66b, permitting circumferential movement of the inner seal face 80a and outer seal face 78b toward each other. After installation of the plurality of seal strips 66 in the slots 53, 54, the spacers 84-3 (tangs) may be deformed toward the respective outer sides 72a into the gap between the inner seal face 80a and outer seal face 78b, to position a circumferential face 88 of the spacer 84-3 in circumferentially spaced relation to the inner seal face 80a and adapted to engage the outer seal face 78b of second tongue portion 68b, as illustrated in FIG. 9C.

Figure 10A:
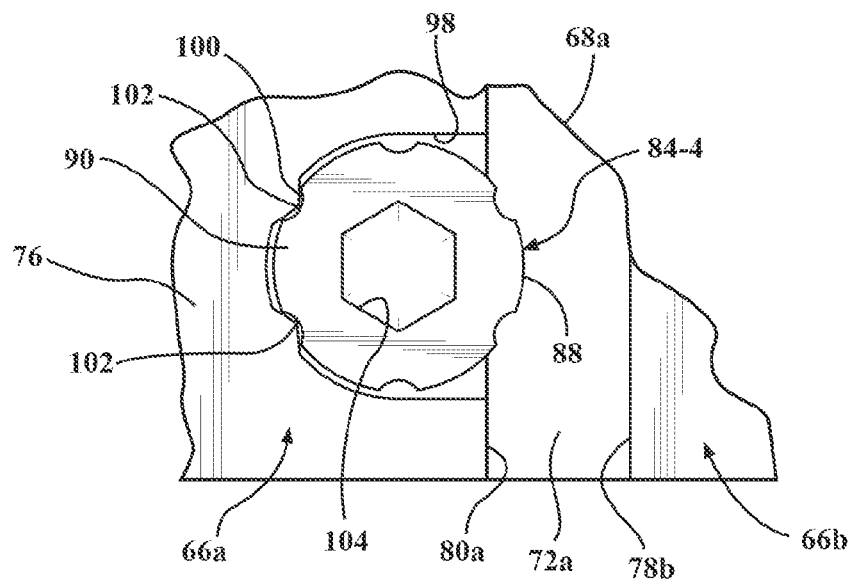
FIG. 10A is a top plan view of an overlap joint formed by two seal strips including a third alternative spacer located at the tongue portion of one of the seal strips.
Figure 10B:
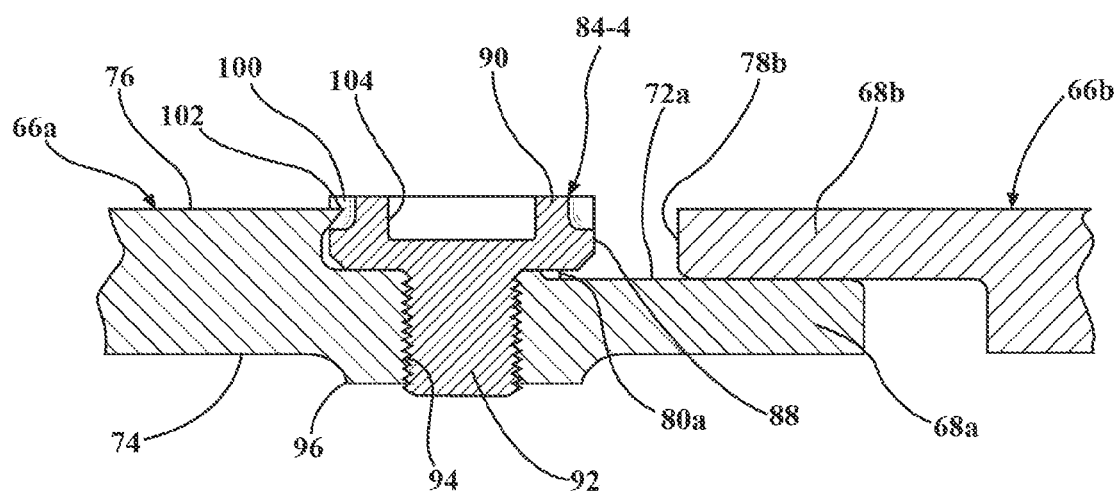
FIG. 10B is an elevation view of the overlap joint shown in FIG. 10A.

Referring to FIGS. 10A and 10B, a third alternative configuration comprising a spacer 84-4 is illustrated. The spacer 84-4 is defined by a bolt-like structure including a head 90 connected to a thread shaft 92. The first seal strip 66a is formed with a threaded hole 94 for receiving the shaft 92 in threaded engagement after installation of the seal strips 66 in the slots 52, 54. Additionally, the inner surface 74 of the first seal strip 66a may be formed with a thickened area 96 (FIG. 10B) at least surrounding the hole 94 to provide additional strength against stresses in the area of the threaded engagement of the bolt 92 within the hole 94.

In a particular configuration for the spacer 84-4, a recess 98 (FIG. 10A) may be formed in the outer surface 76 of the first seal strip 66a, extending circumferentially inward from the inner seal face 80a. The hole 94 may be located in the area of the recess 98, and at least a portion of the head 90 extends circumferentially from the inner seal face 80a toward the outer seal face 78b, wherein a circumferential face 88 is defined on the head 90, circumferentially spaced from the inner seal face 80a and adapted to engage the outer seal face 78b to limit circumferential movement of the first and second seal strips 66a, 66b toward each other. The head 90 may be provided with notches 100 formed in the periphery thereof, and material 102 of the outer surface 76 surrounding the recess 98 may be peened into the notches 100 to prevent rotation of the spacer 84-4 once it is positioned on the seal strip 66a. Further, a tool engagement hole 104 may be provided in the head 90, such as a hex shaped hole for receiving an allen wrench, to facilitate rotational installation of the spacer 84-4.

Referring to FIGS. 11A and 11B, a fourth alternative configuration comprising a spacer 84-5 is illustrated. The spacer 84-5 is defined by a pin-like structure including a shaft 106 and a flange 108 extending radially outward, i.e., radially perpendicular to the axis of the shaft 106. The first seal strip 66a is formed with a through hole 110 for receiving the shaft 106 wherein the hole 110 is spaced circumferentially inward from the inner seal face 80a. An outer end of the shaft 106 opposite from the flange 108 includes a groove 118 for receiving a snap ring 120 to retaining the shaft 106 in position within the hole 110, with a shoulder portion 112 on the flange 108 engaged on the inner surface 74 of the seal strip 66a. In an installation operation, the shaft 106 may be positioned through the hole 110 on the seal strip 66 and the snap ring 120 may be engaged in the groove 118 prior to installation of the seal strips 66 in the slots 52, 54.

In a particular configuration for the spacer 84-5, a recess 114 (FIG. 11A) may be formed in the outer surface 76 of the first seal strip 66a, and the hole 110 is preferably located in the area of the recess 114. The recess 114 extends circumferentially inward from the inner seal face 80a and is sized for receiving a cap 116 on the outer end of the shaft 106, as seen in FIG. 11B. Specifically, the cap 116 includes a groove 122 adapted to engage over and receive a portion of the snap ring 120 to thereby retain the cap 116 adjacent to the outer side 72a of the first tongue portion 68a, such that the cap 116 may be positioned on the outer end of the shaft 106 subsequent to installation of the seal strips 66 in the slots 52, 54. At least a portion of the cap 116 extends circumferentially outward from the inner seal face 80a toward the outer seal face 78b on the second seal strip 66b. In particular, a circumferential face 88 is defined on the cap 116, circumferentially spaced outward from the inner seal face 80a and adapted to engage the outer seal face 78b on the second seal strip 66b to limit circumferential movement of the first and second seal strips 66a, 66b toward each other.

It should be understood that two or more spacers 84-1 . . . 5 may be provided to respective seal strips 66 of the sealing band 60 to sufficiently fill the outer joint gaps 82o between seal strips and prevent an open gap 79 from forming along the sealing band 60. Further, as may be understood from the above description, it is preferred that a spacer 84-1 . . . 5 be provided in each of the outer joint gaps $82_O$, filling at least a portion of the joint gaps $G_O$ subsequent to installation of the seal strips 66 in the sealing band receiving slots 52, 54.

Further, it may be understood that the spacers 84-1 . . . 5 are not limited to implementation on the particular overlapping joint described herein and may be used with other seal strip joint structures. For example, in an alternative structure for the spacers 84-1 and 84-2, a tongue of material 130, such as an elongated generally rectangular strip of material, may extend within the gap 56 axially between the disk faces 48, 50, radially inward from the slots 52, 54, and extending circumferentially across two adjacent seal strip ends 67a, 67b in a so called "underlap joint", as illustrated in FIG. 12. In such a construction, the tongue of material 130 may be attached at the inner surface 74 of a first seal strip 66a, and extend in underlapping sliding relationship along the inner surface 74 of a second seal strip 66b. In the illustration of FIG. 12, the spacer 84-1 is shown affixed at an outer surface 132 of the tongue of material 130 adjacent to a first seal face 134a of the first seal strip 66a for limiting movement of a second seal face 134b of the second seal strip 66b toward the first seal face 134a. Alternatively, it may be understood that the spacer 84-2 may be implemented on the tongue of material 130 in a manner similar to that depicted for the spacer 84-1.

With regard to the joint structure described for FIG. 12, it should be noted that, although the present description references an "underlap" configuration, such terminology is for descriptive purposes and includes functionally overlapping elements for preventing passage of cooling air from the annular cooling air cavity 38.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A sealing band for use in a turbomachine having a plurality of stages, each stage comprising a rotatable disk and blades carried thereby, at least one pair of adjacent rotatable disks defining an annular gap therebetween and having respective opposing sealing band receiving slots aligned with the annular gap, a circumferentially extending sealing band located within the slots, the sealing band comprising:
   a plurality of circumferentially extending seal strips located in series adjacent to one another, and adjacent seal strips including ends located adjacent to one another, each of the plurality of seal strips having a thickness defined by opposing radially facing inner and outer surfaces, the inner and outer surfaces defining the thickness along substantially the entire circumferential extent of each seal strip;
   overlap joints defined by overlapping end portions between adjacent seal strips, the overlapping end portions each formed by a tongue portion of a reduced seal strip thickness extending from a seal face of one seal strip past a seal face defined at a circumferentially distalmost end of the adjacent seal strip, along a radially inward facing side of the adjacent seal strip, wherein the radially inward facing side of the adjacent seal strip engages an outward facing side of the tongue portion;
   a joint gap defined within at least one overlap joint between the seal face of the one seal strip and the seal face of the adjacent strip, the seal faces facing one another at opposing circumferential sides of the gap, wherein the seal face of the one seal strip extends radially inward from the radially outer surface of the one seal strip to the outward facing side of the tongue portion; and
   a spacer affixed to the one seal strip, positioned on and extending outward from the radially outward facing side of the tongue portion, the spacer extending circumferentially from a junction of the spacer and the seal face of the one seal strip, and located at a position within the joint gap between the seal faces face of the one seal strip and the seal face of the adjacent seal strip to limit circumferential movement of the seal faces toward each other.

2. The sealing band of claim 1, wherein each overlapping end portion includes a first tongue portion forming an inner half of a shiplap joint and a second tongue portion forming an outer half of a shiplap joint, an end of the second tongue portion defines the seal face of the adjacent seal strip, and the first tongue portion defines the tongue portion extending from a seal face of one seal strip past a seal face of the adjacent seal strip.

3. The sealing band of claim 1, wherein the tongue portion defines a radial thickness dimension that is less than a radial thickness between radial the radially facing inner and outer surfaces of the seal strips.

4. The sealing band of claim 1, wherein the spacer is defined by a weld bead formed on the tongue portion and defining an engagement surface spaced circumferentially from the seal face of the one seal strip for engaging the seal face of the adjacent seal strip.

5. The sealing band of claim 1, wherein the spacer is defined by a metal piece that is brazed or welded to the tongue and includes at least a portion spaced circumferentially from the seal face of the one seal strip for engaging the seal face of the adjacent seal strip.

6. The sealing band of claim 1, wherein the spacer is defined by a tang that is integral with and extends from the radially outer surface of the one seal strip.

7. The sealing band of claim 1, wherein the one seal strip includes a hole, and the spacer includes a shaft extending through the hole and a head portion connected to the shaft and positioned on the outward facing side of the tongue portion, and the spacer is retained on the one seal strip via the shaft.

8. The sealing band of claim 7, including a recess in the seal face of the one seal strip for receiving at least a portion of the head portion.

9. The sealing band of claim 7, wherein the shaft is a threaded shaft received in a threaded hole and the spacer comprises notches formed in the head portion and engaged by material of the seal strip peened into the notches to prevent rotation of the shaft.

10. The sealing band of claim 7, including a flange extending from the shaft on the radially inner side of the one seal strip, and a cap engaged on an end of the shaft opposite from the flange.

11. The sealing band of claim 1, wherein the spacer is dimensioned in an axial direction, perpendicular to the circumferential direction, to be smaller than the annular gap and located in spaced relation to the disks on either side of the annular gap.

12. A sealing band for use in a turbomachine having a plurality of stages, each stage comprising a rotatable disk and blades carried thereby, at least one pair of adjacent rotatable disks defining an annular gap therebetween and having respective opposing sealing band receiving slots aligned with the annular gap, a circumferentially extending sealing band located within the slots, the sealing band comprising:

a plurality of circumferentially extending seal strips located in series adjacent to one another, and adjacent seal strips including ends located adjacent to one another, each of the plurality of seal strips having a thickness defined by opposing radially facing inner and outer surfaces, the inner and outer surfaces defining the thickness along substantially the entire circumferential extent of each seal strip, the seal strip ends overlapping each other at overlap joints and adjacent seal strips including opposing seal faces movable into engagement with each other;

wherein the overlap joints are dimensioned such that an open gap is formed between two adjacent seal strip ends of one overlap joint when the opposing seal faces of all of the remaining overlap joints are positioned in engagement with each other;

each of the overlap joints formed by a tongue portion of a reduced seal strip thickness extending from a seal face of one seal strip and adapted to extend past a seal face defined at a circumferentially distal-most end of an adjacent seal strip, along a radially inward facing side of the adjacent seal strip, wherein the radially inward facing side of the adjacent seal strip engages an outward facing side of the tongue portion;

a joint gap defined within at least one overlap joint between the seal face of the one seal strip and the seal face of the adjacent strip, the seal faces facing one another in opposing relation to each other, wherein the seal face of the one seal strip extends radially inward from the radially outer surface of the one seal strip to the outward facing side of the tongue portion; and at least one spacer affixed to one of the two adjacent seal strip ends at a position adjacent to one of the seal faces, the spacer extending circumferentially from a junction of the spacer and the seal face of the one seal strip, and positioned on and extending outward from the radially outward facing side of the tongue portion, wherein the spacer is located at a position within the joint gap to limit circumferential movement of the seal faces toward each other.

13. The sealing band of claim 12, wherein the at least one spacer includes at least two spacers that are provided to respective joint gaps, and wherein the spacers are affixed to respective ones of the seal strip ends after the seal strips are assembled in the sealing band receiving slots.

14. The sealing band of claim 13, wherein each of the spacers extend circumferentially from respective ones of the seal faces a respective spacer distance, and the combined spacer distances of all of the spacers is at least equal to a dimension of the open gap in the circumferential direction.

15. The sealing band of claim 13, wherein a spacer is affixed to the tongue portion of each seal strip.

16. The sealing band of claim 12, wherein the at least one spacer includes plural spacers and one of the spacers is affixed to each of the seal strip ends of the sealing band after the seal strips are assembled in the sealing band receiving slots.

17. The sealing band of claim 16, wherein each of the spacers extend circumferentially from respective ones of the seal faces a respective spacer distance, and the combined spacer distances of all of the spacers is at least equal to a dimension of the open gap in the circumferential direction.

* * * * *